United States Patent Office 3,453,149
Patented July 1, 1969

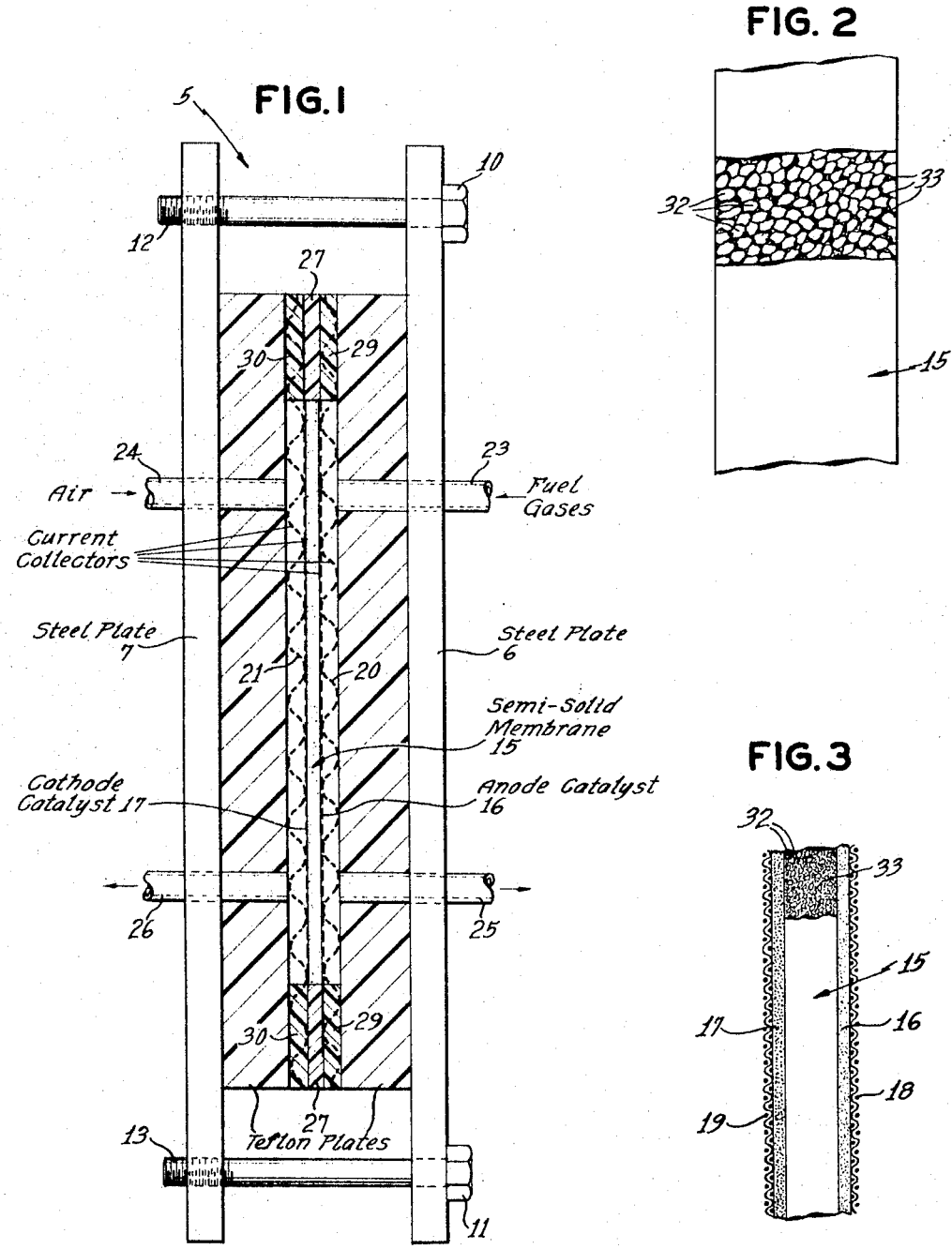

3,453,149
FLUOROCARBON MATRIX MEMBRANE CONTAINING FREE ACID AND METHOD OF FABRICATING
Otto J. Adlhart, Newark, N.J., Modecai J. Halpern, Tel-Aviv, Israel, and Hugh A. Shields, East Newark, N.J., assignors to Engelhard Industries, Inc., Newark, N.J., a corporation of Delaware
Filed Oct. 1, 1965, Ser. No. 491,948
Int. Cl. H01m 27/06
U.S. Cl. 136—153
9 Claims

ABSTRACT OF THE DISCLOSURE

This invention relates to a thin flexible fuel cell electrolyte membrane comprising a porous structural matrix composed of inert inorganic particles bonded together with a fluorocarbon and a free acid electrolyte entrapped in the matrix.

---

It is an object of this invention to provide a matrix-type electrolyte for use in fuel cells which would have the advantages of a free concentrated acid electrolyte without sacrificing the benefits of a solid structure. The use of free strong acid has the advantages of minimizing losses resulting from electrolyte resistance and electrode polarization. Solid membranes can serve as a structural element separating the fuel and oxidant and eliminating the need for structurally strong electrodes. Generally, stricter design tolerances are required for liquid electrolytes and thinner cells having a higher packing density and higher power density can be constructed with solid membranes.

It is also the object of this invention that the electrolyte body be stable at temperatures of at least 100° C. and preferably up to 200° C. It is advantageous to operate fuel cells in the range of about 100°–200° C. since the product water is more easily removed at such temperatures than at lower temperatures. Further, operation at such elevated temperatures permits removal of heat generated as a result of conduction and polarization losses. Ion exchange membranes are known that permit the above-mentioned advantages in cell design, however, no ion exchange membranes are known which can tolerate temperatures over about 100° C.

It is a further object of this invention that the electrolyte body be thin, flexible, and highly resistant to mechanical shock. In the membrane of this invention, which combines a matrix-like structure and a free strong acid electrolyte, which is entrapped in the matrix, it is important that the matrix does not interfere with current flow in the cell.

In accordance with the present invention a new and improved semi-solid electrolyte membrane is provided which includes a shaped, thin, coherent, flexible body, for instance of sheet form, of bonded inert inorganic porous solid carrier particles, and an acid electrolyte filling partially or completely the pores of the inert porous carrier particles. A binder of an inert fluorocarbon having good flexibility bonds together the electrolyte-filled carrier particles. The shaped flexible body is preferably of a uniform or substantially uniform thickness not greater than about 50 mils, more preferably about 10–30 mils. The semi-solid electrolyte membranes are herein characterized by (1) Good resistance to mechanical shock and hence fracture and breakage due to their flexibility;
(2) Thermal stability and utility in fuel cells operating at temperatures up to about 200° C.;
(3) Satisfactory strength despite their thinness; and
(4) Good conductivity with a low specific electrical resistance of usually less than 10 ohm-centimeters. These membranes provide effective separation between the anode and cathode compartments making possible more favorable cell design with respect to weight, dimensions, and cell efficiency.

The inert inorganic component may be an oxide, sulfate, or phosphate of a metal from the group of Zr, Ta, W, Cr, and Nb. It may be noted that group V–B and VI–B oxides are not in all cases satisfactory for the semi-solid electrolytes of this invention since $V_2O_5$ and $MoO_3$ are subject to attack by strong acids at elevated temperatures.

The inorganic carrier particles in themselves have no significant ionic conductivity. The carrier particles are typically of particle size, prior to being bonded together by the organic binder hereinafter disclosed in detail of powder. The porous carrier particles are preferably of high porosity and have a surface area of at least 1 $m.^2/g$.

The fluorocarbon bonding the inert porous carrier particles together is also characterized by being inert to the reactance and the acid electrolyte and thermally stable at the operating temperature of the fuel cell. In addition to functioning to bond the carrier particles together to form a coherent body, the fluorocarbon, which of a flexible material, performs the important function of imparting flexibility to the product semi-solid electrolyte. In fabricating the membrane it is important that the fluorocarbon binder is used in the form of an emulsion rather than a powder. When used as a powder, the polymer tends to retain a particulate form. When used as an emulsion, the polymer forms a network which entraps the free acid.

The acid electrolyte can be an aqueous solution of phosphoric or sulfuric acids. The concentration of the acid will depend on the operating conditions of the fuel cell, e.g., the operating temperature and the relative humidity of the gases entering the fuel cell. Depending on these conditions, the membrane will take up or give off water until an equilibrium is established. Typically, however, the concentration will be for phosphoric acid between 85%–100% and for sulfuric acid between 25%–35%.

The semi-solid membrane electrolytes herein are prepared by mixing together the porous carrier particles, the flexible organic binder, and the electrolyte followed by shaping, for instance by rolling or pressing with or without a mold, the resultant mixture into a desired coherent shape. When the preferred polytetrafluoroethylene is utilized as binder, a "Teflon" emulsion, obtainable in commerce, the porous carrier particles, and the electrolyte are homogeneously mixed together, and the thus-obtained mixture heated to about 200° C. to coagulate and decompose the emulsion. The resulting material is then shaped into the desired shape, for instance by being rolled or pressed into sheet form. The product semisolid membrane electrolyte can also be in the form of a disc or tube, if desired.

Alternatively the semi-solid membrane electrolyte herein can be prepared by mixing together the porous carrier particles and the flexible organic binder, shaping the resulting mixture into the desired shape, and then impregnating the shaped product with electrolyte.

As anode, i.e. fuel electrode, catalyst, a thin layer of a suitable anode catalytic metal, for instance a precious metal, e.g. platinum, palladium, rhodium, ruthenium, iridium, or osmium, either alone or as mixtures or alloys, is affixed or attached to that side of the semi-solid electrolyte which is to be supplied with the fuel. The anode catalyst layer is preferably a thin layer of the catalyst in powder form, and of thickness preferably of not more than 0.2 mm. An electronically conductive member, for instance a fine mesh metal screen with the metal being resistant to the cell reactant and the catalytic metal, e.g. of tantalum, tungsten, or platinum is secured over the catalyst layer for draining off or withdrawing electrons.

As illustrative, the anode catalyst powder which may contain polytetrafluoroethylene powder admixed therewith for wet-proofing purposes, is pressed as a thin layer by a hydraulic press at a pressure of about 1000 lbs./square inch into the surface of the semi-solid electrolyte sheet or membrane intended to be supplied with the fuel. An 80 mesh platinum screen was secured over the thin catalyst layer for withdrawing electrical energy from the anode. Alternatively, the anode catalyst powder admixed with the polytetrafluoroethylene powder can be pressed as a thin layer onto the platinum screen, and the thus-treated screen secured over the surface of the semi-solid membrane electrolyte intended to be supplied with the fuel.

As cathode, i.e. oxidizer electrode, catalyst, a suitable cathode catalytic metal, for instance a precious metal, e.g. platinum, palladium, rhodium, iridium or gold, either alone or as mixtures or alloys, can be utilized. The cathode catalyst layer is also preferably a thin layer of catalyst in powder form, and of thickness similar to that of the anode catalyst layer. The cathode catalyst layer is affixed or attached to that side of the semi-solid membrane electrolyte which is to be supplied with the oxidizer or oxidizing gas, usually the opposite side of the semi-solid electrolyte, in similar manner as is the anode catalyst. The electronically conductive member, for instance the fine mesh metal screen, e.g. of platinum, is secured in contact with the cathode catalyst similarly as is the electronically conductive member with the anode catalyst layer.

Reference is now made to the accompanying drawings wherein:

FIGURE 1 is an elevational sectional view through a fuel cell equipped with the semi-solid electrolyte membrane or sheet of this invention;

FIGURE 2 is a diagrammatic enlarged longitudinal sectional view of the semi-solid electrolyte membranes or sheet of this invention; and FIGURE 3 is a fragmentary longitudinal section through a semi-solid electrolyte membrane herein having anode and cathode catalyst layers affixed to opposite faces thereof intended to be supplied the fuel and oxidizer respectively, with an electronically-conductive members secured over the catalyst layers for electron withdrawal.

Referring to FIGURE 1, fuel cell 5 comprises side plates 6 and 7 of steel. Bolts 10 and 11 having threaded end portions 12 and 13 respectively extend through corresponding registering openings in the side plates 6 and 7, their threaded end portions engaging corresponding threaded inner surfaces of the openings in plate 7 to hold the fuel cell assembly together.

Flexible semi-solid membrane electrolyte sheet 15, as shown more clearly in FIGURES 2 and 3, is made up of porous tantalum oxide powder particles 32, bonded together with polytetrafluoroethylene 33, with aqueous phosphoric acid solution of 85% concentration filling the pores of the carrier particles. Semi-solid electrolyte sheet 15 is preferably of about 10–30 mils thickness.

Referring again to FIGURE 1 and also to FIGURE 3, thin anode catalyst layer 16 is of platinum (95) ruthenium (5) powder embedded into the surface of the semi-solid electrolyte sheet 15, and thin cathode catalyst layer 17 is of platinum black embedded into the opposite surface of the semi-solid electrolyte sheet 15. Fine mesh platinum screens 18 and 19 of typically 80 mesh are secured over the anode catalyst and cathode catalyst layers 16 and 17 respectively for collecting electrons, and coarse mesh platinum screens 20 and 21, shown in the FIGURE 1 embodiment only, of typically 20 mesh are secured over the fine mesh screens 18 and 19.

With reference to FIGURE 1, supply conduits 23 and 24 supply fuel and oxidizer to the anode and cathode respectively, and discharge conduits 25 and 26 provide for discharge of reaction product and effluent gases. Teflon gasket 27 is shown at the top and bottom of the semi-solid member electrolyte 15. Portions 29 and 30 of the current collector screens 20 and 21 respectively are shown filled with Teflon to seal off the fuel and air compartment.

In operation, a fuel, for instance a hydrogen gas, is supplied to the anode catalyst 16 through supply conduit 23, and an oxidizing gas, e.g., air is supplied to the cathode through conduit 24. As a result of electrochemical reaction, electrons are liberated at the anode with the formation of protons. The electrons are collected by platinum collector screen 18 and drained off through platinum conductor screen 20. The withdrawn electrons are utilized to do work and then return to the cell cathode for the cathode electrochemical reaction, which proceeds as follows:

$$\tfrac{1}{2}O_2 + 2e + 2H^+ \rightarrow H_2O$$

The protons needed in the reaction are supplied by migration through the semi-solid electrolyte from the anode. The water generated on the cathode is removed by an excess flow of air or oxygen.

The following examples are of compositions for preparing semi-solid acid electrolyte membranes in accordance with this invention.

Example I

| | | |
|---|---|---|
| Zirconium oxide | g | 30 |
| $H_3PO_4$ | g | 95 |
| Teflon emulsion T-30 | ml | 30 |

Example II

| | | |
|---|---|---|
| Tungsten oxide ($WO_3$) | g | 60 |
| $H_3PO_4$ | g | 40 |
| Teflon emulsion T-30 | ml | 15 |

Example III

| | | |
|---|---|---|
| Tantalum oxide | g | 13 |
| $H_3PO_4$ | g | 6.5 |
| Teflon emulsion T-30 | ml | 4 |

Example IV

| | | |
|---|---|---|
| Tungsten oxide ($WO_3$) | g | 60 |
| $H_2SO_4$ | g | 35 |
| Teflon emulsion T-30 | ml | 15 |

Example V

| | | |
|---|---|---|
| Zirconium oxide | g | 30 |
| $H_2SO_4$ | g | 85 |
| Teflon emulsion T-30 | ml | 30 |

Example VI

| | | |
|---|---|---|
| Tantalum oxide | g | 13 |
| $H_2SO_4$ | g | 6.5 |
| Teflon emulsion T-30 | ml | 4 |

In order to control the acid content, the membrane may be equilibrated by keeping it in acid of desired strength for several days.

In Examples I–III the membranes were prepared with $H_3PO_4$ of 100% concentration and in Example IV–VI the membranes were prepared with $H_2SO_4$ of 100% concentration. The prepared membranes are then equilibrated in concentrated acid solution, e.g., 85% $H_3PO_4$ and 25% $H_2SO_4$ or otherwise within the concentration range herein previously set forth. In Examples I and V zirconium oxide is converted to zirconium phosphate and zirconium sulfate and respectively by reaction with the phosphoric acid and sulfuric acid. Teflon emulsion T-30 given in the examples is an aqueous emulsion of polytetrafluoroethylene containing about 60% by weight of such polymer.

The specific resistance of semi-solid electrolyte sheets or membranes are produced by rolling out intimate mixtures of the ingredients of the following examples:

Example VII

A series of test runs using the semi-solid acid electrolyte membrances of this invention as the electrolyte body in a fuel cell, and with different fuels supplied to the anode in the test runs and technical grade oxygen supplied to the cathode as oxidizer in the runs was carried out. The anode catalyst was Pt black and the cathode catalyst was Pt Black. The semi-solid electrolyte sheet or membrane was of thickness of 20–25 mils, and the membrane was prepared by mixing together 30 g. $ZrO_2$, 98 g. $H_3PO_4$ (100% concentration) and 30 ml. Teflon emulsion T–30. The catalyst was in the form of a black pressed into the opposite faces of the semi-solid electrolyte membrane. A platinum gauze green was secured over each catalyst layer, which in turn contacted a coarse tantalum screen serving a current collector. The operating temperature of the sell during the runs was about 165° C. The test run results are set forth in Table I hereafter.

2. The semi-solid electrolyte membrane of claim 1 wherein the fluorocarbon polymer is polytetrafluoroethylene.

3. The semi-solid electrolyte of claim 1 wherein the acid electrolyte is aqueous $H_2SO_4$ solution.

4. The semi-solid electrolyte of claim 1 wherein the acid electrolyte is aqueous $H_3PO_4$ solution.

5. The semi-solid electrolyte membrane of claim 1 wherein the inert inorganic particles are zirconium phosphate, the fluorocarbon polymer is polytetrafluoroethylene and the concentrated entrapped acid is phosphoric acid.

6. The semi-solid electrolyte membrane of claim 1 wherein the inert inorganic particles are tantalum oxide, the fluorocarbon polymer is polytetrafluoroethylene and the concentrated entrapped acid is phosphoric acid.

TABLE I

| Fuel | $H_2O$ saturation temperature (° C.) | Cell voltage in volts at the indicated current density in ma./cm.² | | | | | | |
|---|---|---|---|---|---|---|---|---|
| | | 0 | 20 | 30 | 50 | 75 | 100 | 150 |
| $H_2$ | Dry | 1.03 | .96 | .94 | .91 | .88 | .86 | .80 |
| Reformer $H_2$ | 83 | 1.03 | N.T. | N.T. | N.T. | N.T. | .82 | N.T. |
| Ethane | 83 | .90 | .62 | .59 | .53 | N.T. | N.T. | N.T. |
| Propane | 83 | .92 | .67 | .61 | .54 | .46 | .39 | N.T. |
| Butane | 85 | .90 | .64 | .59 | .53 | N.T. | N.T. | N.T. |
| Carbon monoxide | 83 | 1.01 | .64 | .42 | N.T. | N.T. | N.T. | N.T. |

The cell voltage values set forth in Table I include the voltage drop due to the specific resistance of the semi-solid electrolyte membrane. Such membrane had a specific resistant of 5.4 ohm/cm. The abbreviation "N.T." in Table I and also in Table II hereinafter means the voltage reading was not taken at the particular current density given.

Example VIII

A series of test runs were carried out using the semi-solid acid electrolyte sheet membrane of composition and thickness substantially identical to that of the runs of Example VII, as well as substantially identical operating conditions and similar fuels as that of Example VII. However in the last test run of this example the anode catalyst was a mixture, by weight, of 95% Pt and 5% Ru and the cathode catalyst was Pt. The results are set forth in Table II which follows:

7. The semi-solid electrolyte membrane of claim 1 wherein the inert inorganic particles are zirconium sulfate, the fluorocarbon polymer is polytetrafluoroethylene and the concentrated entrapped acid is sulfuric acid.

8. A method for preparing a thermally stable, thin, flexible electrolyte membrane for a fuel cell which comprises:

(a) mixing together porous inorganic particles selected from the group consisting of oxides of zirconium, tantalum, tungsten, chromium and niobium, an aqueous emulsion of a fluorocarbon polymer and a concentrated acid comprising phosphoric acid or sulfuric acid, (b) heating the mixture to about 200° C. to coagulate the emulsion, and (c) shaping the resultant material into a sheet form, whereby the polymer forms a network structure which entraps said acid.

TABLE II

| Fuel | $H_2O$ saturation temperature (° C.) | Cell voltage in volts at the indicated current density in ma./cm: | | | | | | |
|---|---|---|---|---|---|---|---|---|
| | | 0 | 20 | 30 | 50 | 75 | 100 | 150 |
| $H_2$ | Dry | 1.03 | .96 | .94 | .91 | .88 | .86 | .80 |
| Reformer $H_2$ | 83 | 1.03 | .91 | .91 | .88 | .85 | .82 | ².76 |
| Ethane | 83 | .92 | .73 | .69 | .63 | .55 | N.T. | N.T. |
| Propane | 83 | +.90 | .73 | .69 | .62 | .55 | .50 | N.T. |
| Butane | 85 | +.90 | N.T. | ¹.65 | .61 | .55 | N.T. | N.T. |
| Carbon monoxide | 83 | 1.02 | .63 | .57 | .48 | N.T. | N.T. | N.T. |

¹ At a current density=40 ma./cm.²
² At a current density=170 ma./cm.²

What is claimed is:

1. A thermally stable, shaped, thin, flexible semi-solid electrolyte membrane for a fuel cell composed of a matrix consisting essentially of inert, solid, inorganic, porous particles bonded with an inert coagulated fluorocarbon polymer in the form of a network structure, and a free concentrated acid electrolyte entrapped in said network, wherein the inorganic particles are a compound which is a member of the group consisting of an oxide, sulfate and phosphate of at least one of the metals zirconium, tantalum, tungsten, chromium, and niobium.

9. A method according to claim 8 wherein the porous inorganic particles are zirconia powder having a surface area of at least 1 m.²/g.

References Cited

UNITED STATES PATENTS

| 3,056,647 | 10/1962 | Amphlett | 136—153 |
| 2,980,749 | 4/1961 | Broers | 136—86 |
| 3,276,910 | 10/1966 | Grasselli et al. | 136—86 |
| 3,297,484 | 1/1967 | Niedrach | 136—86 |

ALLEN B. CURTIS, *Primary Examiner.*